US009557588B2

(12) United States Patent
Huitema et al.

(10) Patent No.: US 9,557,588 B2
(45) Date of Patent: Jan. 31, 2017

(54) FRONT LIGHTING FOR ROLLABLE OR WRAPPABLE DISPLAY DEVICES

(75) Inventors: Hjalmar Edzer Ayco Huitema, Veldhoven (NL); Pieter J. G. van Lieshout, Beek en Donk (NL); Volker Barnhart Verschoor, Delft (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 12/446,174

(22) PCT Filed: Oct. 18, 2007

(86) PCT No.: PCT/NL2007/050502
§ 371 (c)(1),
(2), (4) Date: Mar. 9, 2010

(87) PCT Pub. No.: WO2008/048100
PCT Pub. Date: Apr. 24, 2008

(65) Prior Publication Data
US 2010/0194785 A1 Aug. 5, 2010

Related U.S. Application Data

(60) Provisional application No. 60/862,058, filed on Oct. 19, 2006.

(51) Int. Cl.
*G06F 1/16* (2006.01)
*G02F 1/1333* (2006.01)
(Continued)

(52) U.S. Cl.
CPC ....... *G02F 1/133305* (2013.01); *G02F 1/1336* (2013.01); *G02F 1/167* (2013.01);
(Continued)

(58) Field of Classification Search
CPC ...... G06G 1/615; G06G 1/616; G06G 1/1639; G02F 1/1336; G02F 2001/133616
(Continued)

(56) References Cited

U.S. PATENT DOCUMENTS 5,510,806 A * 4/1996 Busch ............................ 345/87
5,658,063 A * 8/1997 Nasserbakht ................ 353/122
(Continued)

FOREIGN PATENT DOCUMENTS

EP 1 542 067 A 6/2005
GB 2 336 020 A 10/1999
(Continued)

OTHER PUBLICATIONS

International Search Report for PCT/NL2007/050502 dated Jan. 3, 2008.
(Continued)

*Primary Examiner* — Premal Patel
(74) *Attorney, Agent, or Firm* — Jefferson IP Law, LLP

(57) ABSTRACT

A display device includes a housing, a screen connected to the housing and being configured to display data in greyscale on a first portion of the screen, and at least one light source connected to the housing. The light source is configured to project color content on a second portion of the screen. The screen may be flexible and/or rollable on a roller included in the housing. The screen may be electrophoretic and/or reflective. The display device may also include optics or a light guide-to-guide light from the light source to the screen. Further, optics may be provided to detect light reflected from the screen and direct more light to portions of the screen having reduced illumination.

11 Claims, 5 Drawing Sheets

(51) Int. Cl.
  *G02F 1/1335* (2006.01)
  *G02F 1/167* (2006.01)
  *G09F 9/30* (2006.01)
  *G03B 21/00* (2006.01)

(52) U.S. Cl.
  CPC ......... *G03B 21/006* (2013.01); *G06F 1/1601* (2013.01); *G06F 1/1615* (2013.01); *G06F 1/1639* (2013.01); *G06F 1/1647* (2013.01); *G06F 1/1652* (2013.01); *G09F 9/301* (2013.01); *G02F 2001/133616* (2013.01)

(58) Field of Classification Search
  USPC ........ 345/156, 168, 600, 681, 690; 361/681; 353/30, 31, 69
  See application file for complete search history.

(56) References Cited

U.S. PATENT DOCUMENTS

| | | | |
|---|---|---|---|
| 6,380,921 B2* | 4/2002 | Nakamura | 345/102 |
| 7,206,196 B2* | 4/2007 | Ghosh et al. | 361/679.09 |
| 7,594,728 B2* | 9/2009 | Seal et al. | 351/210 |
| 8,009,422 B2* | 8/2011 | Misawa | 361/679.55 |
| 2003/0169233 A1* | 9/2003 | Hansen | 345/158 |
| 2003/0174120 A1* | 9/2003 | Weiner et al. | 345/156 |
| 2004/0029636 A1* | 2/2004 | Wells | 463/32 |
| 2004/0052037 A1* | 3/2004 | Sawyer | 361/681 |
| 2004/0061683 A1* | 4/2004 | Mochizuki et al. | 345/168 |
| 2004/0140982 A1* | 7/2004 | Pate | 345/600 |
| 2004/0223097 A1* | 11/2004 | Kamijo | 349/113 |
| 2005/0145807 A1* | 7/2005 | Lapstun et al. | 250/566 |
| 2005/0264525 A1* | 12/2005 | Adams et al. | 345/156 |
| 2006/0034039 A1* | 2/2006 | Van Rens | 361/681 |
| 2006/0119625 A1* | 6/2006 | Hunt et al. | 345/690 |
| 2006/0209213 A1* | 9/2006 | Baker | 348/578 |
| 2006/0234784 A1* | 10/2006 | Reinhorn | 455/575.1 |
| 2007/0081239 A1* | 4/2007 | May et al. | 359/443 |
| 2007/0091433 A1* | 4/2007 | Garner et al. | 359/459 |
| 2009/0059102 A1* | 3/2009 | Chien | 349/5 |
| 2009/0102973 A1* | 4/2009 | Harris | 348/565 |

FOREIGN PATENT DOCUMENTS

| | | |
|---|---|---|
| JP | 05-336479 | 12/1993 |
| JP | 10 012040 A | 1/1998 |
| JP | 10 311979 A | 11/1998 |
| JP | 2003-004910 A | 1/2003 |
| JP | 2005-191422 A | 7/2005 |
| JP | 2005-215648 | 8/2005 |
| JP | 2005-266601 A | 9/2005 |
| JP | 2005-326551 | 11/2005 |
| JP | 2006-133273 A | 5/2006 |
| WO | WO 99/04576 | 1/1999 |
| WO | WO 2004/008239 A1 | 1/2004 |
| WO | WO 2005/114309 A1 | 12/2005 |

OTHER PUBLICATIONS

Japan Patent Office, Office Action, Patent Application Serial No. 2009-533267, Oct. 30, 2012, Japan.
Japan Patent Office, Office Action, Patent Application Serial No. 2014-049387, Jan. 30, 2015, Japan.

* cited by examiner

FRONT LIGHTING FOR ROLLABLE OR WRAPPABLE DISPLAY DEVICES

FIELD OF THE INVENTION

The present invention relates to rollable or wrappable display devices, such as reflective rollable display devices provided with front-lighting.

BACKGROUND

Typically transmissive displays are illuminated with a backlighting system where light from the backlighting source passes through the transmissive display towards a viewer. Reflective displays cannot use a conventional backlighting system due to blockage of the backlight by the non-transmissive (i.e., reflective) display. Therefore, front-lighting systems have been developed for reflective displays. These front-lighting systems include a light source at the edge of the reflective display and a light-guiding system with a light guide on top of the display, for example. The light guide has out-coupling structures on its surface for coupling the light out towards the reflective display. This way, the light is evenly spread over the complete display area and reflected towards the viewer.

Performance of front-lighting systems for reflective displays is poor compared to back-lighting systems for transmissive displays due to contrast degradation by unwanted out-coupling of light directly towards the viewer, instead of being reflected first from the reflective display, for example.

For reflective liquid crystal displays (LCDs), which are currently the dominant display technology, a good alternative for the currently used front-lighting systems is not available. One reason is because the light has to be coupled into the reflective LCD at an almost perpendicular angle to the display surface. Otherwise, grey level shifts occur due to viewing angle problems that are inherent to LCD effects.

For electrophoretic displays, the situation is different. The display effects of electrophoretic displays do not have the viewing angle problems associated with LCD displays. Rather, the electrophoretic displays are almost perfect (Lambertian) diffuse scatterers of light. Therefore, the front-light does not have to be coupled into the electrophoretic display at a perpendicular angle to the display surface. This opens new ways of making a good front-lighting system for electrophoretic displays that may be flexible displays. Conventional electrophoretic cells are described in U.S. Pat. No. 6,906,851 to Yuasa, and U.S. Patent Application Publication No. 2005/0179852 to Kawai, each of which is incorporated herein by reference in its entirety.

Flexible displays including rollable or wrappable displays are expected to become more commonplace. Wrappable or rollable displays may be manufactured using a variety of display elements, e.g. LCD elements or Organic Light Emitting Display (OLED) elements, deposited on or sandwiched between flexible substrates, e.g. polymer substrates. Light emitting polymers offer various advantages such as excellent viewing angle and contrast, as well as low power consumption.

SUMMARY OF THE INVENTION

Reflective wrappable or rollable displays cannot satisfactorily use a conventional front-lighting system used in conventional liquid crystal (LC), since the thickness of the front-lighting system increases the overall thickness of displays having the front-light. For wrappable or rollable displays, typical thickness requirement is less than 200 microns, while a typical display with a front-light will approximately be at least 1 mm thick. Such a thick display cannot be rolled or wrapped at best roll improperly. Accordingly, there is a need for wrappable or rollable reflective displays illuminated with a front-lighting system.

One object of the present systems and methods is to overcome the disadvantage of the conventional reflective displays, and provide for front-lighted reflective displays that are wrappable and/or rollable.

This and other objects are achieved by display devices and methods comprising a housing, a screen connected to the housing and being configured to display data, e.g., text, in grey-scale on a first portion of the screen, and at least one light source connected to the housing. The light source is configured to project color content on a second portion of the screen. The screen may be wrappable and/or rollable on a roller included in the housing. The screen may be electrophoretic and/or reflective. The display device may also include a light guide or optics to guide light from the light source to the screen. Further, optics may be provided to detect light reflected from the screen and direct more light to portions of the screen having reduced illumination.

Further areas of applicability of the present systems and methods will become apparent from the detailed description provided hereinafter. It should be understood that the detailed description and specific examples, while indicating exemplary embodiments of the displays and methods, are intended for purposes of illustration only and are not intended to limit the scope of the invention.

BRIEF DESCRIPTION OF THE DRAWINGS

These and other features, aspects, and advantages of the apparatus, systems and methods of the present invention will become better understood from the following description, appended claims, and accompanying drawing where:

DETAILED DESCRIPTION OF THE DRAWINGS

The following description of certain exemplary embodiments is merely exemplary in nature and is in no way intended to limit the invention, its application, or uses. In the following detailed description of embodiments of the present systems, devices and methods, reference is made to the accompanying drawings which form a part hereof, and in which are shown by way of illustration specific embodiments in which the described devices and methods may be practiced. These, embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Figure 1:
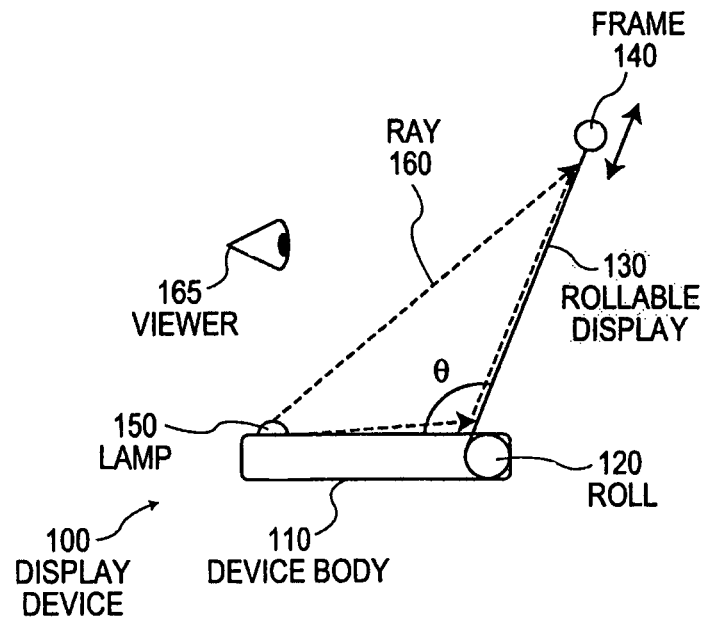
FIG. 1 shows a cross-section of a rollable display device in the unrolled position according to one embodiment.

FIG. 1 shows a cross-section of a rollable display device 100 having a housing 110 including a roller 120 onto which a flexible or rollable display 130 is rolled. FIG. 1 shows the rollable display 130 in the extended position, unrolled over a cover or frame 140 of rigid or semi-rigid material. The cover or frame 140 may be movably attached to one side of the housing 110 for example, such as via hinges, for covering the housing in the closed position. The cover or frame 140 may include a latch to lock to a mating unit on the housing 110 in the closed position and is movable or rotatable in the open position to any desired tilting angle θ, similar to a movable or tiltable display of laptop computers for example. At least one light source 150 is, included in the housing 110 for illuminating the rollable display 130 when unrolled over the cover 140 in the open position. FIG. 1 shows the illumination from the light source 140 as dashed lines 160, as well as a viewer 165 looking at the rollable display screen 130.

Figure 2:
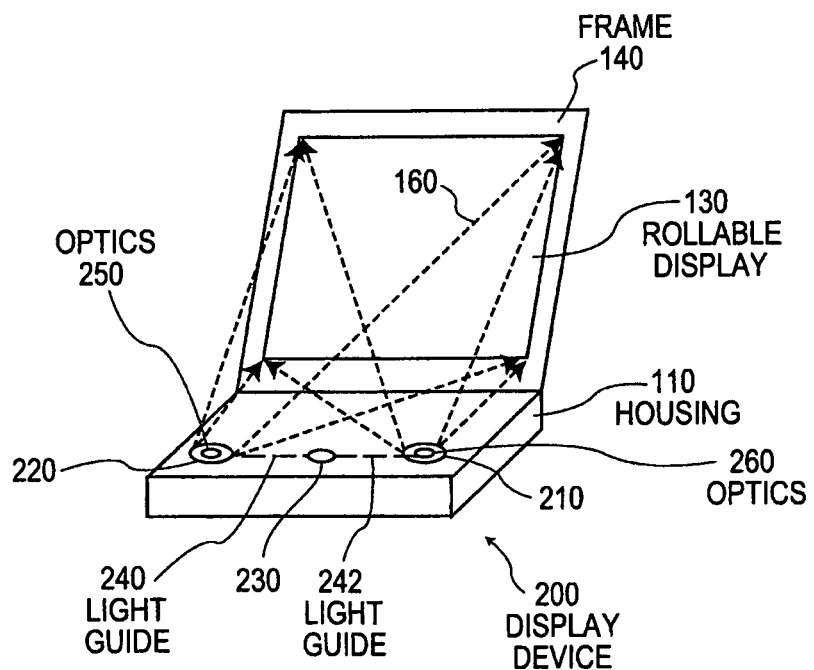
FIG. 2 shows a prospective view of a rollable display device according to another embodiment.

FIG. 2 shows a prospective view of a rollable display device 200 where illumination rays 160 of the rollable display 130 is provided from two locations 210, 220 near far corners (relative the display 130) of the housing 110. Two light sources may be provided at each location 210, 220. Alternatively, a single light source 230 (such as located between the two locations 210, 220, e.g., substantially at center thereof) may be used along with two light guides 240, 242 to guide the light from the light source 230 to the exit locations 210, 220. Illuminating the display 130 from the two light exit locations 210, 220 or light sources overcomes possible shadowing by hands or fingers of a user 165 when operating the display device 100.

A conventional display illuminated with two light sources located on a lid of the display is described in U.S. Pat. No. 6,380,921 to Nakamura, while other conventional display devices having light sources on the display to illuminate a keyboard are described in U.S. Pat. No. 6,776,497 to Huppi and in International Publication No. WO 02/17683 to Hunter, each of which is incorporated herein by reference in its entirety.

Any light source(s) may be used where a light emitting diode(s) (LEDs) is particularly well suited to provide the desired illumination and/or colored images, and have a relatively small size and/or weight. Further, LEDs can be easily configured to provide images and/or light with changing light attributes (such as changing colors, intensity, hue, saturation and other attributes), and typically have electronic drive circuitry for control and adjustment of the various light attributes. Of course, the LEDs may include individually controllable red (R), green (G) and blue (B) LEDs associated with sub-pixels, that in combination provide or form a pixel of any desired color, where the pixels form RGB or color images, or provide illumination having any desired color, intensity and the like.

It should be noted that better illumination is achieved if the display 130 is rolled-out of the device 100 under an obtuse angle θ with the device body or housing 110. This angle θ should be chosen such that the light is not reflected in a specular way from the surface of the display 130.

Figure 3:
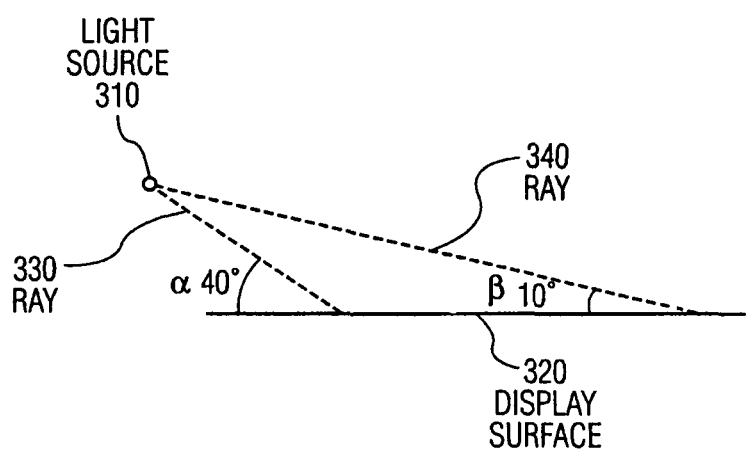
FIG. 3 shows light that is reflected directly from the surface of the display at the two extreme angles.

Typically more light will be directly reflected and thus lost from the display surface (e.g., reflected toward portions that are not in the viewing field of the viewer) when the angle between the light rays and the illuminated surface is shallow or small. Light losses, e.g., from specular reflections, may be due to a transparent coating of the display, where the transparent coating is typically not as "perfectly" diffuse scatterer of light as the E-ink is. This is schematically shown in FIG. 3 where a light source 310 illuminates a display surface 320. One light ray 330 is incident on the surface 320 at an angle α of 40°, while another light ray 340 is incident at an angle β of 10°. At a 40° angle, there is approximately ±5% loss due to reflection (97% of which in the perpendicular plane), while at 10° there is approximately ±40% loss due to reflection (70% of which in the perpendicular plane).

Such light losses due to specular reflections may be compensated for by using optics including controllable and/or movable lenses and/or detectors 250, 260, such as the two locations 210, 220, that detect light reflected from the screen and send more light to those parts of the display screen 130 where the undesired reflections, such as specular reflections, and thus loss is highest or higher than other screen areas. Such optics, controller and detectors may also be used to compensate for the simple fact that the portion of the display nearer to the light source(s) receives more light per square millimeter, as the solid angle from the point light source is spread over a smaller area. The undesired or specular reflection may be reduced by using correctly polarized light. A polarization filter on top of the light source or antireflection coating on top of the display is therefore one solution to eliminate part of the reflections from the surface directly into the viewer's eyes. Alternatively, a light source or optics in the light path with a higher efficacy than a polarization filter may be used to generate the preferred polarization of the light.

Rollable displays with the lighting system as described are especially suited for display effects that reflect the light in a diffuse way, such as electrophoretic display available from E ink Corporation or SiPix Imaging Inc. One reason is that diffuse reflectance is tolerant to the angle of the incident light.

In addition to illuminating the rollable display 130 with white light, the light source(s) 150, 230 may also, or alternatively, provide colored illumination as well as project colored images. The colored light source(s) 150, 230 may provide a different color to illuminate the display 130, or portions thereof, when using the front lighting system. A particularly interesting application includes the use of controllable light sources to provide any desired color, such as LEDs which may include red, green and blue LEDs in at least one or each of the light sources 150, 230 where, for example, the RGB LEDs form sub-pixels to provide a pixel of any desired color. An array of LEDs may be provided for illumination and/or projection of color images, where the array of LEDs or pixels form the color image.

Varying the color of the light source(s) 150, 230 changes the color of the display 130 to any color including black and white depending on the application or the context within an application. Further, when a colored and segmented or pixelated light source(s) 150, 230 is used capable of projecting an image onto the rollable display 130, then it is possible to light different areas of the display in different colors. When the segmentation or pixelation of the LED array(s) 150, 230 is larger than the pixel structure of the display 130, different segments of the display may have different color(s), depending on the application context (for example advertisement in red and black).

When the pixelation of the light source(s) 150, 230 is matched with the pixelation of the display 130, then a full color image may be created with the combination of the light source(s) 150 and the display. For example, the display 130 may generate grey levels, while the light source(s) 150, 230 may generate the color. Further, display 130 may generate grey levels while color images may be generated and projected onto the display 130, or portions thereof, by the light source(s) 150, 230 which is configured as a full color projector. In this case, the rollable display 130 may generate more grey levels or a larger dynamic range in a grey scale mode, and may be switchable to a projection mode to display color images projected onto the display 130 from the light source(s) 150, 230.

Figure 4:
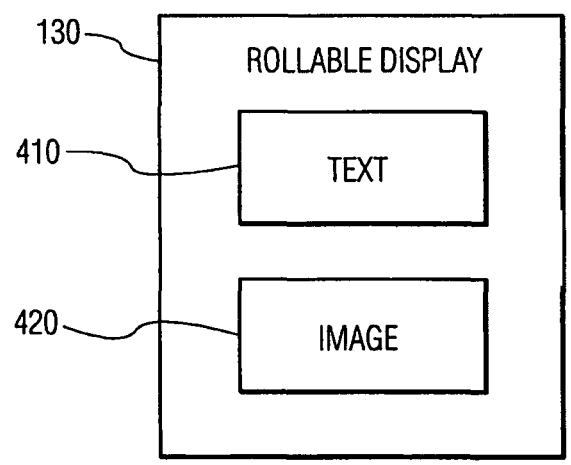
FIG. 4 shows a frontal view of the rollable display device.

A further mode may include a combination of grey scale and projection mode. This allows for a better display where, as shown in FIG. 4 for example, black and white or grey scale text is displayed in one display portion(s) 410 using the grey-scaled rollable display 130, while color images are projected onto another portion(s) 420 of the rollable display 130 from the light source(s) 150, 230. The rollable display 130 is switchable among the various modes, either manually (in response to user input and selection from a user interface 535 or automatically such as upon detection, by a detector or processor 510 (FIG. 5) of the rollable display device 100, 200, of the type of content or data being displayed, e.g., text (or images) in black and white or grey scale (to be displayed in grey scale), or images (or text) in color (to be determined in color). The processor 510 may be configured to detect the content to determine whether the content includes text, color images, or a combination of both, as well as locations of the various types of content. Based on the content analysis and detection, the processor 510 may be further configured to automatically select the optimal display mode. Content analysis and detection of character and/or images are well known, such as described in U.S. Pat. No. 6,714,594 to Dimitrova, and U.S. Patent Application Publication No. 2004/0168205 to Nesvadba, each of which is incorporated herein by reference in its entirety.

Figure 5:
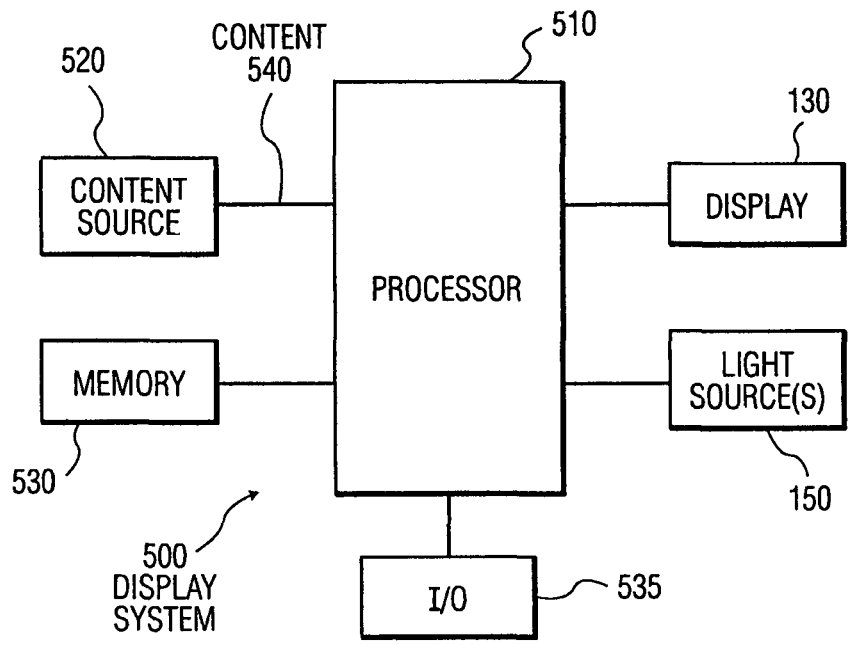
FIG. 5 shows a rollable display system according to another embodiment.

FIG. 5 shows a display system diagram 500 of the rollable display. The display system 500 includes the processor 510 operationally coupled, via any type of link such as a wired or wireless link, to a content source 520, a memory 530, a user interface 535, a rollable display screen 130, and at least one controllable light source 150. The user interface 535 may include a keyboard or keys, mouse and the like. Content 540 from the content source 520 may be text, video and/or audio content which may be live or recorded, e.g., broadcast by a broadcaster or received from the Internet. The content source 520 may also include further memory which, as the memory 530, may be any suitable type of memory where the content 540 and other data are stored or recorded, including a remote memory accessible through a network, local or wide area network such as the Internet, or a local memory of the system 200, such as a hard drive, or a removable memory including a DVD, for example.

The memory storing the content 540 may be the same memory 530 or a further memory in addition to the memory 530. At least one memory 530 may also store application data as well as other desired data accessible by the processor 510 for configuring it to perform operation acts in accordance with the present system. The operation acts include controlling the display 130 to display the content 540 (upon processing thereof, such as decoding and generating video signals for display on the display 130), where text portion of the content 520 is displayed by the grey-scaled screen display 130, while image portion of the content 520 is projected onto the display 130 by the light source(s) 150 in appropriate portions 410, 420 of the display screen 130, such as shown in FIG. 4, for example. The processor 510, in combination with the controllable optics, lenses and detectors 250, 260, may also be configured to detect areas of illumination of the screen 130, and control the light source (s) 150 to direct more light to portions of the screen 130 having reduced illumination.

Clearly the processor 510, the memory of content source 520, the memory 530, the display screen 150 and/or the light source(s) 150 may all or partly be a portion of a single (fully or partially) integrated unit such as the display device 100 shown in FIG. 1, which may by any device having display, such as rollable display devices, telephones such as clamshell phones, electrophoretic displays, devices with reflective LC displays including a personal digital assistant (PDA), a television, computer system, or other electronic devices. Further, instead of being integrated in a single device, the processor may be distributed between one electronic device or housing and an attachable display device 100.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 530 or other memory coupled to or accessible by the processor 510.

The computer-readable medium and/or memory 530 and/ or the memory associated with the content source 520 for storing the content 540 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that can store and/or transmit information suitable for use with a computer system may be used as the computer-readable medium and/or memory.

Additional memories may also be used. The computer-readable medium storing the content 540, the memory 630, and/or any other memories may be long-term, short-term, or a combination of long-term and short-term memories. These memories configure the processor 510 to implement the methods, operational acts, and functions disclosed herein. The memories may be distributed or local and the processor 510, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within the memory 530 or the memory associated with the content source 520 where the content 540 is stored, for instance, because the processor 510 may retrieve the information from the network for operation in accordance with the present system.

The processor 510 is capable of providing control signals to control the light source(s) 150, 230 and/or performing operations in response to detection of the light reflected from the display screen 130 to control the controllable LEDs and/or movable lenses and optics 250, 260 to emit the desired light or images at desired locations of the display screen 130, including sending more light to parts of the display screen 130 where light losses or stray reflections are greatest to provide uniformly illuminated screen or parts thereof.

The processor 510 may be an application-specific or general-use integrated circuit(s). Further, the processor 510 may be a dedicated processor for performing in accordance with the present system or may be a general-purpose processor wherein only one of many functions operates for performing in accordance with the present system. The processor 510 may operate utilizing a program portion, multiple program segments, or may be a hardware device, such as a decoder, demodulator, or a renderer such as TV, DVD player/recorder, PDA, mobile phone, etc, utilizing a dedicated or multi-purpose integrated circuit(s).

Any type of processor may be used such as dedicated or shared one. The processor may include microprocessors, central processing units (CPUs), digital signal processors (DSPs), ASICs, or any other processor(s) or controller(s) such as digital optical devices, or analog electrical circuits that perform the same functions, and employ electronic techniques and architecture. The processor is typically under software control for example, and has or communicates with memory that stores the software and other data such as user preferences. The processor is configured to relate the ambient light to the video information displayed on the relevant display image area, such as the content displayed near edges of the screen.

The processor may also include any intelligent device that may allow controlling directly or indirectly the light source (s) 150 so that character of the output light made therefrom changes, to project color images onto the screen 130 and/or provide illumination having any desired light attributes including color, hue, saturation, intensity, or other photometric quality, e.g., specular reflection properties, retroreflective properties, etc.

Figure 6:
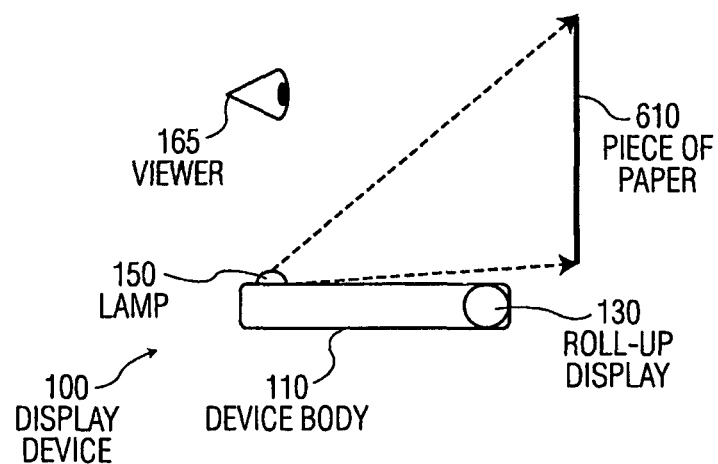
FIG. 6 shows a cross-section of the rollable display device of FIG. 1 in the rolled position.

FIG. 6 shows the rollable display device 100 with the proposed lighting system, where the display (130 shown in FIG. 1) is rolled into the housing 110, while the light source 150 is on. This enables lighting of other objects such as a piece of paper 610 or any other object or device, such as mobile phones, PDAs etc. to provide better visibility to the viewer 165.

Figure 7:
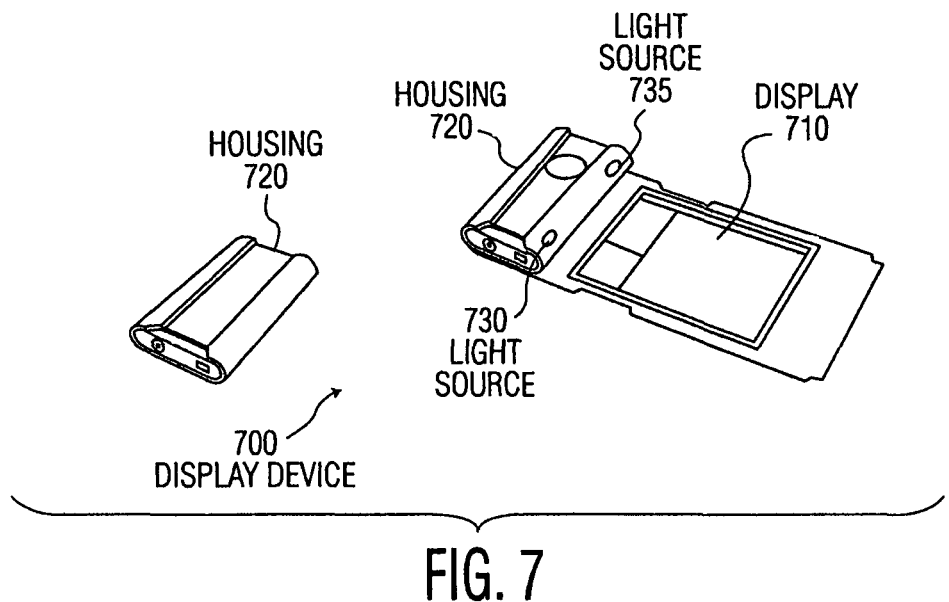
FIGS. 7-9 show further embodiments of the display device.
Figure 8:
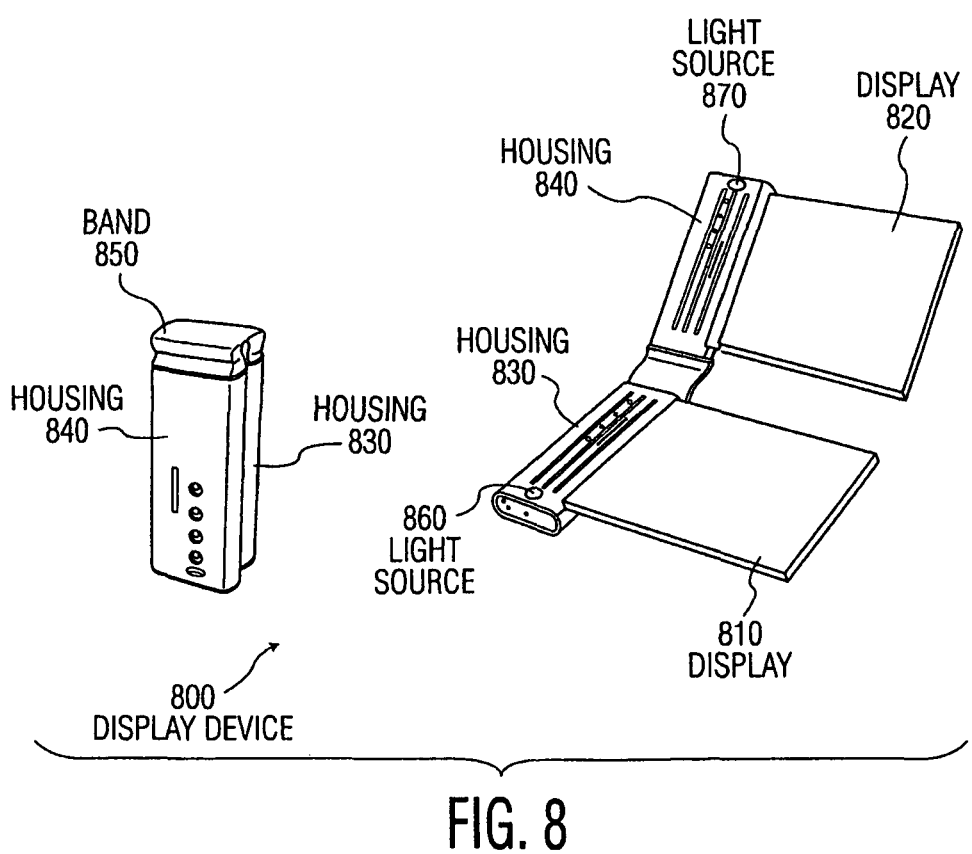
Figure 9:
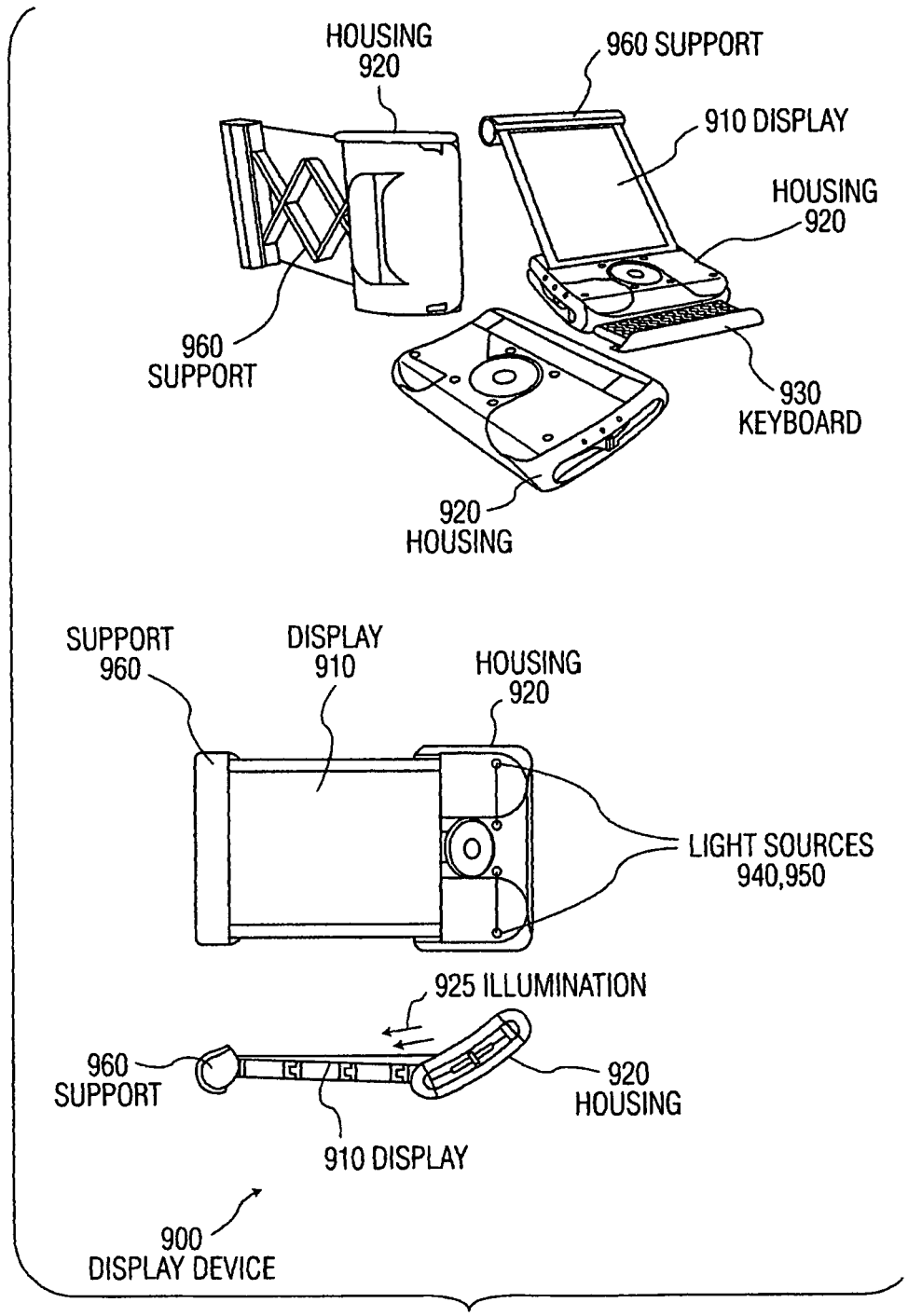

FIGS. 7-9 show further embodiments of the display device. In particular, FIG. 7 shows a display device 700 including a display 710 which may be rolled inside the display housing 720 or wrapped around the display housing 720. Light source(s) 730, 735 are provided to illuminate the display 710 or project images on portions or the entire display 710. Although FIG. 7 shows the display 710 extending horizontally from the display housing 720, it should be understood that the display 710 may be tiltable with respect to the display housing 720 at any desired angle θ, as shown in FIG. 1 to provide better illumination or image projection on the display 710 by the light source(s) 730, 735.

FIG. 8 shows a display device 800 which includes two rollable or wrappable displays 810, 820 with associated housings 830, 840 that are movably connected by any movable means 850, such as hinges and/or a band of flexible and/or resilient material, such as metallic or non-metallic, e.g., flexible plastic, that allows movement and positioning of the housings 830, 840 at any desired position. One or more light sources 860, 870 may be provided on each housing 830, 840 to illuminate and/or project images onto the display associated with the other housing. For example, the light source 860 illuminates the display 820, and the light source 870 illuminates the display 810.

FIG. 9 shows another display device 900 which includes a rollable display 910 that extends from one portion of the housing 920, as well as an input device, such as a keyboard 930 that extends from another portion of the housing 920. At least one light source is also provided on the housing 920 to illuminate and/or project images 925 onto the display 910, where two sources 940, 950 are shown in FIG. 9. FIG. 9 also shows an extendable supporting structure 960 that holds the display 910 in the unrolled or extended position.

Alternatively, light source 150, 230, 730, 735, 860, 870, 940, 950 maybe mounted on top of an arm that can be pivoted between a closed and opened position, in which it projects light to the screen to illuminate and/or project images onto the display. Of course, it is to be appreciated that any one of the above embodiments or processes may be combined with one or more other embodiments or processes to provide even further improvements in finding and matching users with particular personalities, and providing relevant recommendations.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item(s) or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A display device comprising:
   a housing;
   a display screen connected to the housing, wherein the display screen is a reflective display screen configured to display data in grey-scale on a first portion of the display screen;

at least one light source connected to the housing, the at least one light source being configured to project color content only on a second portion of the display screen; and a processor configured to control the at least one light source to project light of different intensity according to light loss of the second portion, wherein the first portion is not overlaying the second portion, and wherein the color content comprises one or both of images and text.

2. The display device of claim 1, wherein the display screen is flexible and rollable into the housing and/or wrappable around the housing.

3. The display device of claim 1, wherein the display screen is a reflective liquid crystal display configured to display the data in grey-scale.

4. The display device of claim 1, further comprising a light guide or optics configured to guide light from the at least one light source to the display screen.

5. The display device of claim 1, wherein the display screen is an electrophoretic display configured to display the data in grey-scale.

6. The display device of claim 1, wherein the display screen is configured to reflect light diffusely.

7. The display device of claim 1, wherein the at least one light source is further configured to illuminate an object when the display screen is rolled into the housing.

8. The display device of claim 1, wherein the processor is further configured to generate signals to display both the display data in grey-scale and the color content.

9. A display device comprising:
a housing;
a display screen connected to the housing, wherein the display screen is a reflective display screen configured to display data in grey-scale;
at least one light source connected to the housing, the at least one light source being configured to project data in color; and
a processor configured to process content from a content source and to send more light to a portion of the display screen with greatest light loss or stray reflection, wherein the processor determines a gray-scale portion of the content and a color portion of the content, and accordingly controls the display screen to display the gray-scale portion of the content on a first portion of the display screen, and controls the at least one light source to project the color portion of the content on a second portion of the display screen,
wherein the first portion is not overlaying the second portion.

10. The display device of claim 9, wherein the gray-scale portion of the content is text, and the color portion of the content is images.

11. The display device of claim 9, wherein the display screen is an electrophoretic display.

* * * * *